(12) United States Patent
Carcich

(10) Patent No.: US 7,446,132 B2
(45) Date of Patent: Nov. 4, 2008

(54) ZEOLITE ADDITIVE FOR RUBBER AND PLASTIC

(76) Inventor: John Carcich, 1649 Lulka Pl., Campbell, CA (US) 95008

( * ) Notice: Subject to any disclaimer, the term of this patent is extended or adjusted under 35 U.S.C. 154(b) by 24 days.

(21) Appl. No.: 11/548,276

(22) Filed: Oct. 10, 2006

(65) Prior Publication Data

US 2007/0142484 A1   Jun. 21, 2007

Related U.S. Application Data

(63) Continuation of application No. 10/696,966, filed on Oct. 29, 2003, now abandoned.

(51) Int. Cl.
*C08K 3/34* (2006.01)
*C08J 9/00* (2006.01)

(52) U.S. Cl. .................. 521/100; 521/122; 521/123; 524/444; 524/436; 524/437; 524/438; 524/450; 524/492; 524/571

(58) Field of Classification Search ................ 521/100, 521/122, 123; 524/436, 437, 438, 444, 450, 524/492, 571
See application file for complete search history.

(56) References Cited

U.S. PATENT DOCUMENTS 4,968,728 A   11/1990   Wason

| 6,353,146 | B1 | 3/2002 | Williams |
|---|---|---|---|
| 6,355,710 | B1 | 3/2002 | Yanagisawa et al. |
| 6,573,323 | B2 | 6/2003 | Kikuchi et al. |
| 7,256,233 | B2 | 8/2007 | Simonot et al. |

FOREIGN PATENT DOCUMENTS

| EP | 1148085 | | 10/2001 |
|---|---|---|---|
| JP | 09234364 A | | 9/1997 |
| JP | 10324118 | | 12/1998 |
| KR | 2001057033 | * | 2/2003 |
| SU | 715124 | | 2/1980 |

OTHER PUBLICATIONS

Kirk-Othmer's Concise Encyclopedia of Chemical Technology. John Wiley and Sons. 1985. New York. (Index only).
Toril, K. Utilizationof natural zeolites in Japan. Article, National Inductrial Research Institute. Tohoku, Nigatake, Haranomachi, Sendai, Japan. 1978; 441-449.

* cited by examiner

*Primary Examiner*—Irina S Zemel
(74) *Attorney, Agent, or Firm*—Wilson Sonsini Goodrich & Rosati PC

(57) ABSTRACT

Composition comprising a rubber or plastic material and a zeolite. The composition may be foamed or not. The composition may absorb water or other chemicals, and has characteristics making it useful in the manufacture of a variety of products.

30 Claims, No Drawings

ZEOLITE ADDITIVE FOR RUBBER AND PLASTIC

CROSS-REFERENCE TO RELATED APPLICATIONS

This application is a continuation application of Ser. No. 10/696,966 filed, Oct. 29, 2003, now abandoned which is incorporated herein by reference in its entirety and to which application we claim priority under 35 USC § 120.

FIELD OF THE INVENTION

This invention relates to rubber and plastic items containing zeolites, and methods for manufacturing such items. More specifically, the invention includes methods and apparatus that use absorbent and adsorbent materials in a shoe lining; and most particularly, this invention relates to methods and apparatus that provide shoe liners, sole inserts, and similar rubber and plastic apparatus, and methods to create such absorbent rubber and plastic.

BACKGROUND OF THE INVENTION

Rubber and similar products, such as neoprene, urethane, and the like are ubiquitous in modern life. They are used in thousands of places considered entirely normal today. The properties of rubber, including elasticity, the ability to be easily foamed, and the ability it was named for, the ability to erase pencil lines, have been exploited thoroughly in modern life. Of course, since World War II and after thousands of synthetic latexes have been formulated to fill various specialized niches. However, despite all these improvements, rubber is poor at the absorption of moisture and water.

Rubber is normally quite water repellant. It can be made to absorb moisture if it is foamed, one example being kitchen sponges, but the moisture goes to the interstices of the rubber rather than into the rubber composition itself. It would be advantageous to have a rubber composition that absorbed at least some moisture as well as odor causing components, such as ammonia and the like.

One example of a use for this would be for use in the inner soles placed in athletic shoes and the like. Feet, as other parts of the body, produce perspiration. This creates a continuous source of moisture on the interior of shoes. Since a foot confined in a shoe has little opportunity to shed this moisture, there is a problem of keeping the feet fresh. A variety of methods, for example powders and the like, have been tried to keeping shoes smelling fresh and clean. One other method of preparing shoes for wearing includes the addition of a shoe insert to the interior of a shoe. These inserts frequently have ingredients that allow the foot and the One potential solution is the addition of zeolites to the rubber composition. Zeolites are alumino-silicates having complex crystalline structures than can allow the crystalline structure to absorb small molecules, such as water ammonia. Zeolites are also used in cracking catalysts for petroleum processing and similar uses. Again, the reason for such uses is that zeolites can exclude molecules based on the molecular size of the molecule. They can exclude in the micro range (<2 nm) or the meso-range (2-20 nm).

There are families of zeolites or molecular sieves as they are frequently known, that are defined by their molecular structures, in particular their crystalline structures, and their chemical compositions. One important family of zeolites is alumino-silicates having the general empirical formula of $M_{2n}O.Al_2O_3.ySiO_2.wH_2O$, where y is 2 or greater, M is the charge of a balancing action, such as sodium, potassium, magnesium and calcium, n is the action valance, and w represents the number of moles of water contained in the zeolitic voids.

Of the 120 or so zeolites known to exist, about 50 are naturally occurring and the rest are synthetic. Commercially available naturally occurring zeolites include chabzite, eroionite, mordenite, and chinoptilolite. Other zeolites included faujasite, philipsite, zeolite A, zeolite L, Zeolite Y, zeolite X and ZSM-5. All these zeolites vary by the particulars of their cage structure and the pore sizes, and therefore, vary in the molecules that can be excluded by the zeolites. Many zeolites are mined directly from the earth, and these are less pure than synthetic zeolites containing dirt, clays, and other associated material from the earth. However, mined zeolites work well in this application, as long as they are ground to at least as small as 300 mesh. And that is the source of their problem for use in rubber. If the zeolite is added just as mined, the final product will be brittle, and will not absorb water or moisture.

SUMMARY OF THE INVENTION

This invention provides rubber or plastic compositions are made by adding a zeolite that has been dried and crushed to an average size of less than 300 mesh. In general, throughout this application, references to rubber are considered to include known plastic materials in addition to known rubber materials. The rubber composition may be foamed and can be made from a variety of materials, including natural or synthetic latex, or polyurethane. These compositions allow rubber to be moisture and odor absorbent, even if the rubber is not foamed. They can be used for a wide variety of products, including, as examples, shoe inserts, bed pads, gasket materials, computer mouse pads, seating cushions, and the like. The rubber of the present invention can be easily regenerated by heating the rubber to between about 50° C. and 150° C.

One aspect of this invention is a rubber composition comprising: between about 10 weight percent and 90 weight percent of a rubber material selected from the group consisting of natural rubber and synthetic rubber; between about 80 weight percent and 1 weight percent of a zeolite that has been dried at between 50° C. and 150° C. for between about one and twenty four hours, prior to manufacturing, and ground to a size smaller than 300 mesh; and at least enough stabilizers and vulcanizers to stabilize the composition.

Another aspect of this invention is a method of making a rubber composition comprising: adding to a rubberized compound in its liquid state, a zeolite that has been dried at between 50° C. and 150° C. for between about one and twenty four hours, and ground to a size smaller than 300 mesh and at least one stabilizer; molding the liquid material; and shaping the solidified material.

Yet another aspect of this invention is a method of freshening the inside of shoes comprising: placing a renewable insert comprising a rubberized matrix and a zeolitic odor absorbent, said zeolite odor absorbent containing zeolite that has been dried at between 50° C. and 150° for between about one and twenty four hours, and ground to a size smaller than 300 mesh in the inside of the shoe.

DETAILED DESCRIPTION OF THE INVENTION

Rubber, either natural or synthetic, or rubber like materials, such as polyurethane, can be formulated with zeolite as an additive. The rubber of Plastic can be solid or foam, either open cell or closed cell foam. The resulting formulation has unusual properties including reduced curing time and the ability of the rubber formulation to absorb moisture, even in formulations that are not foam rubber. The composition including between about 10 weight percent and 90 weight percent of a rubber material selected from the group consisting of natural rubber and synthetic rubber; and between about 85 weight percent and 1 weight percent of a zeolite. The composition may also contain stabilizers, vulcanizers, and other ingredients to produce a superior rubber product.

The rubbers are either natural or synthetic. Natural rubber is the product of rubber trees and is mostly isoprenes. Synthetic rubbers include polyisoprene, styrene butadiene, nitrile rubbers, butyl rubbers, ethylene propylene terpolymers, silicone rubbers, neoprenes, polysulfide, poly acetyl, eperchloride, fluorelastomers, hypalon, halogenated butyl, polyurethanes, and thermoplastic rubbers. Stabilizers can include those selected from the group consisting of alkaline earth carbonates, and other alkali metal carbonates and alkaline earth carbonates, and other alkali metal bicarbonates. For example, the composition of the stabilizer of alkaline earth carbonates is in the form of limestone, calcium carbonate, magnesium carbonate, sodium carbonate, potassium carbonate, sodium bicarbonate and potassium bicarbonate. Vulcanization ingredients include sulfur, TMTD (tetramethyl thioperoxide carbonic diamide or Thiran) and a host of others. Other additives include vulcanizer accelerants, peroxide cures, and retarders. For example, group II B metal oxides such as zinc oxide; Aflux 16; TMTD; MBT (2-Mercaptobezothiozole); and DPTT can be added. Various other ingredients can be included in a rubber formulation, for example, diethylene glycol, ethylene glycol, and other poly-ethers. The color can be modified by adding, for example, MT Black. Paraffinic oil can give the final composition resilience and flexibility. Although new additives are being found, the technology of rubber formulation is quite old, and comprehensive list of suitable additives can be found in Kirk-Othmer's *Concise Encyclopedia of Chemical Technology* (and the parent *Encyclopedia of Chemical Technology* in its various editions as well) 1985, John Wiley and Sons, New York under articles for Rubber and Rubber Compounds, which disclosure is incorporated in full herein.

Nearly any zeolite can be used in this invention. Zeolites, also known as molecular sieves, having a pore size ranging from about 2 Angstroms to 100 Angstroms are preferred, those having pore sizes between about 3 angstroms to 20 Angstroms are particularly preferred. These zeolites can be used, as can any naturally or synthetically made zeolite including chabzite, eroionite, mordenite, chinoptilolite, faujasite, philipsite, zeolite A, zeolite L, Zeolite Y, zeolite X and ZSM-5. The key to an acceptable zeolite is that the pore size that characterizes the zeolite be of a size sufficient to capture water molecules. One particularly preferred zeolite is chinoptilolite.

Surprising and unanticipated features of this invention are twofold. First, the zeolite used must be dried before it is added to the rubber composition. The drying of mined zeolite is easily accomplished by exposing the mined zeolite to a temperature between about 50° C. and 100° C., preferably between about 60° and 150° C. and most preferably between 75° C. and 200° C. for between one and twenty hour hours, preferably between three and eighteen hours and most preferably between four and twelve hours. Zeolite so processed will be referred to as "dried zeolite" herein; although it will be realized by those having even a mere passing knowledge of the art that the starting material is neither wet nor does it contain visible moisture. Any and all moisture in the mined product is contained within the interstices of the zeolitic crystalline structure. Second, the zeolite, whether it is natural or synthetic, must be ground to a mesh size of no larger than 300 mesh (approx. 0.08 mm in diameter); that is the average diameter of the particles useful in this invention must have diameters of no more than 300 mesh. Zeolite so ground or crushed will be referred to as "crushed zeolite" herein.

Rubber compositions that contain undried zeolite do not cure well, and may deform after curing. Moreover, zeolite having mesh sizes as small as 250 mesh (0.1 mm) do not give satisfactory results. It is preferred that the zeolite be crushed before it is exposed to the drying.

The zeolite used in this invention must be dried before processing to achieve the advantages of this composition. In most embodiments, the zeolite is preferably ground to at least a 250 grid, more preferably a 300 grid, and most preferably to at least a 325 grid. However, in some embodiments even smaller grid sizes ranging between 250 and 350 grid or smaller may be preferred.

One of the great advantages of the composition of this invention is that the life of plastic and rubber is significantly extended.

Products made using the method of this invention and the products of this invention may be tested several ways using standardized tests used to test rubber and plastic products. First, the product of this invention has superior curing properties—that is the product will cure as it is being made faster than either rubber or rubber with larger zeolite additives; and second, the product of this invention has superior moisture retention properties.

This invention can provide a composition that can easily absorb moisture into rubber, as the rubber incorporating dried and crushed zeolite is no longer hydrophobic. This invention can be used for a very wide variety of items including, but not limited to, shoe inserts, bed pads, gasket materials, computer mouse pads, seating cushions, tires, and the like. There is no limitation to the uses for this invention.

It can be used for hoses, foam rubber can be made either open cell and close cell, rubber pipes, hospital pads, mattress pads, shoes, particularly shoes for sports, tennis, running, walking jogging, it can be made with bi-directional composts, leather shoe liners, shoe soles, heels, shoe inserts for tennis shoes, hockey shoes, ski shoes and the like, for injected molded rubber parts, filled and non filled with reinforcement materials, rubber belts, fan belts, tires reinforced by web material, and non reinforced, tires, industrial and automobile gaskets, valves, aircraft parts, and roof liners. It can be used in sporting goods including but not limited to tennis balls, baseballs, footballs, soccer, wet suits, golf balls, gloves, protective pads, skis, bats, helmets, liners for sports equipment and the like. Further uses include rope, cooking utensils, storage tanks, pump propellers, air bladders, shocks absorbers and as clothing liners or as a component of the fabric incorporated into fabric. It can be formed by various extruded rubber methods, or using compression molding. An additional possible use includes use of a membrane formed in accord with the invention as a cell membrane in hydrogen energy cells. For example, zeolite added to naphaline has been found to improve the durability of such membranes.

Some compositions of the invention exhibits good coefficients of friction for gripping surfaces, which may be useful when the compound is used in tires and shoe soles.

The composition of this invention can be used to absorb moisture, while strengthening rubber and plastic, preventing electrolysis, slowing the aging process of the rubber and plastic articles, and reducing cycle time in manufacturing of plastic and rubber. Shoes, especially athletic shoes, usually have three components. The first one is the shoe sock that surrounds the inner shoe, usually made of foam rubber of EVA plastic foam. The second one is the inner sole that is one the inside of the bottom next to the foot, and it is usually made of EVA Plastic and is foam. The outer sole is usually rubber.

An inner shoe sock could also be used on leather shoes to prevent the leather from cracking and deteriorating as it ages.

There are preliminary indications that some composition of this invention eliminate or reduces electrolysis. This effect is noticed in shoes using EVA plastic foam in the sock where heat and moisture create an electrolysis process.

This invention allows the absorption of other components that may be undesirable as well, such as, ammonia and urea (particularly, in the case of shoes), hydrogen sulfide, methane, and alcohols, particularly methanol, ethanol, and the like.

Once water and other substances have been absorbed into the rubber, the rubber will lose its ability to absorb more moisture. However, the material of this invention can be regenerated by heating it to between about 50° C. and 150° C. for between about 30 minutes and 5 hours. Indeed, for many applications, the rubber can be regenerated by placing it outside in the sunlight for between about 30 minutes and eight hours.

One example embodiment of products that can be made using this invention are shoe inserts. A shoe can be kept fresh by using components that contain at least some zeolite. Such components include inserts, that is removable pads for the foot to rest on disposed within the shoe, and linings, which are not removable. The zeolite absorbs odors and can then release these odors when the shoe insert is removed for airing out. Usually, just the act of removing the shoe from the foot will provide at least some airing of the insert, even if it is not removed from the shoe.

The insert may be made of rubber or synthetic rubber, polyurethane, neoprene, and the like, and the zeolite is added as to the rubber mixture formulation. Between 1 weight percent and 85 weight percent of the formulation of the shoe insert will be zeolite. The balance of the mixture will be a mixture of between 25 weight percent and 75 weight percent rubber material and between 75 weight percent and 25 weight percent of a stabilizer. Preferred stabilizers include calcium and other alkaline earth carbonates, sodium and other alkali metal carbonates and bicarbonates. Similarly, sulfates, silicates, aluminate and the like can be used as the stabilizer for the insert composition of the shoe. It should be realized that the exact composition of the stabilizer is not critical to this invention, and any composition conventionally used for stabilization of rubber compositions can be beneficially used in the invention.

The insert of the present invention can be made to fit inside a shoe, for example, in an athletic shoe or in an orthopedic shoe. Although, the insert will generally be used inside and on the bottom surface of an enclosed shoe, open shoes such as sandals, and the like can beneficially use the insert of the present invention. It should also be realized that the insert may be for the portion of the shoe between the shoe and the foot. The present invention can be used for freshen shoes and feet or to provide a means of providing a hygienic environment for the advancement of foot care for such diseases as athletes foot, and similar ailments.

It will be appreciated that the insert of the present invention can be made as a single molded piece or a plurality of pieces bonded together to form a more cushioned insert or a form fitting piece—indeed such form fitting pieces can be custom molded to fit a particular foot inside a particular shoe. It will also be realized that the rubber shoe insert of this invention containing zeolite can be used as a top layer to any other type of composition being used as a shoe insert.

EXAMPLES

The example shown herein are exemplary of the invention and are not intended to limit the scope of the appended claims in any manner.

Example 1

This example shows how to make a composition suitable for the insert of the present invention.

100 grams of naturally occurring chinoptilolite is ground to 300 mesh and then the fine particles are dried at 100° C. for six hours before being added to a 100 grams of rubber in liquid state. The mixture is stirred for fifteen minutes then approximately 50 grams of calcium carbonate is added to the mixture.

The mixture is made into a long band, solidified and the shoe inserts are cut from the cooled band.

Similarly, other zeolite that can be substituted include chabzite, eroinoite, mordenite, chinoptilolite, faujasite, philipsite, zeolite A, zeolite L, Zeolite Y, zeolite X and ZSM-5. Similarly, other polymers that can be substituted include latexes made from isoprenes, polisoprenes, styrene butadienes, nitrile rubbers, butyl rubbers, ethylene propylene terpolymers, silicone rubbers, neoprenes, polysulfides, poly acetyls, eperchlorides, fuloroelastomers, hypalons, halogenated butyl, polyurethanes, and thermoplastic rubbers. The compositions can be hard or foamed.

Similarly, other stabilizers include sodium carbonate, magnesium carbonate and potassium carbonate.

Example 2

The composition of claim one is cast in a mold the size and shape of the shoe sole. The material in the mold is ready for use within fifteen minutes of being placed in the mold.

Example 3

In an alternative to Example 2, the composition of claim 1 may be formed as a single sheet, and inserts the size and shape of shoe inserts cut from the sheet.

Example 4

Alternative compositions can be made by mixing ingredients.

Compound A, compound B, and compound C were made by mixing the ingredients together while liquid and slowly cooling the composition formed. The compounds were made. The amounts of ingredients are listed in TABLE 1. The composition was foamed to make an open cell foam rubber. The various compositions were then tested.

Similarly, non-foam rubbers and closed foam rubbers may be made using the formulations listed above.

Similarly, latexes made from isoprenes, polyisoprenes, styrene butadienes, nitrile rubbers, butyl rubbers, ethylene propylene terpolymers, silicone rubbers, neoprenes, polysulfides, poly acetyls, eperchlorides, fluoroelastomers, hypalon, halogenated butyls, polyurethanes, and thermoplastic rubbers synthetic rubbers, may be substituted for the rubber, BUNA, of the formulations listed above.

Similarly, accelerants, stabilizers, retarders and the like may be added to the formulations listed above to achieve the desired results.

TABLE 1

ZEOLITE FORMULATIONS (amounts expressed as grams of ingredient)

| INGREDIENTS | COMPOUND A | COMPOUND B | COMPOUND C |
|---|---|---|---|
| BUNA EPT 6470 P | 100.00 | 100.00 | 100.00 |
| ZINC OXIDE | 5.00 | 5.00 | 5.00 |
| AFLUX 16 | 2.00 | 1.50 | 1.50 |
| TMTD | .50 | .50 | .50 |
| MBT | 1.50 | 1.50 | 1.50 |
| SULFUR | 1.50 | 1.50 | 1.50 |
| DPTT | .75 | .75 | .75 |
| DIETHYLENE GLYCOL | 2.00 | 2.00 | 2.00 |
| MT BLACK | 5.00 | 5.00 | 5.00 |
| GROUND LIMESTONE | 100.00 | 50.00 | 25.00 |
| ZEOLITE (dried and ground to 300 mesh) | 100.00 | 150.00 | 200.00 |
| PARAFFINIC OIL | 100.00 | 100.00 | 100.00 |

Example 5

This example shows the properties of the Compound A made in Example 4.

Compound A, with 100.00 grams of naturally occurring and mined clinoptolite, a zeolite, which was dried and crushed as noted, was made and tested. The compound was formed and cured in less than two thirds of the time it took for rubber compound to cure. The compound had good abrasion resistance, and shape recovery after stretching.

Example 6

This example shows the properties of the Compound B made in Example 4.

Compound B, with 150.00 grams of naturally occurring and mined clinoptolite, which was dried and crushed as noted, was made and tested. Although this compound was better than rubber alone, the extra zeolite gave a composition that had slightly less good abrasion resistance than the composition of Example 5, although it was still well within the acceptable range. It also had slightly less good shape recovery.

Example 7

This example shows the properties of the Compound C made in Example 4.

Compound C, with 200.00 grams of clinoptolite, failed both tests.

Example 8

This example shows the regeneration of the rubber of this invention that has absorbed water.

A sample of rubber made as in example 5 is used as a shoe insert. After a day of use, the insert is taken from the shoe and set out in the sunlight for eight hours. The shoe insert is now essentially moisture free, and can be used again.

Example 9

This example shows the properties of the compound A made in Example 4.

Compound A, with 100.00 grams of naturally occurring and mined clinoptolite, a zeolite, but which was not dried and was crushed only to 200 mesh, was made and tested. The compound was formed but took slightly more time to cure than the rubber composition alone. The compound had poor abrasion resistance, and shape recovery after stretching.

This invention has been described by a reference to specific embodiments and examples thereof. Various modifications, changes and alterations of this invention will naturally suggest themselves to those skilled in the art. It is intended that all such modifications, changes and alterations of the invention be encompassed by the appended claims.

What is claimed is:

1. A composition comprising: between about 10 weight percent to 90 weight of a material selected from the group consisting of natural rubber, synthetic rubber, and plastic; and between about 85 weight percent and 5 percent of a zeolite dried at between about 100° C. and 150° C. for between about one hour and twenty four hours.

2. The composition of claim 1 wherein the composition includes a foamed rubber material.

3. The composition of claim 2 wherein the foamed rubber is selected from the group consisting of closed cell foam and open cell foam.

4. The rubber composition of claim 3 wherein the foamed rubber is selected from the group consisting of open cell foam rubber.

5. The composition of claim 1 wherein the composition includes a foamed rubber composition having a latex selected from the group consisting of natural latex, isoprenes, polyisoprenes, styrene butadienes, nitrile rubbers, butyl rubbers, ethylene propylene terpolymers, silicone rubbers, neoprenes, polysulfide, poly acetyl, eperchloride, fluoroelastomers, hypalon, halogenated butyl, polyurethanes, and thermoplastic rubbers.

6. The composition of claim 1 wherein the zeolite is selected from the group consisting of chabzite, eroionite, mordenite, chinoptilolite, faujasite, philipsite, zeolite A, zeolite L, Zeolite, zeolite X and ZSM-5.

7. The rubber composition of claim 6 wherein the zeolite is chinoptilolite.

8. The composition of claim 1 wherein the composition further includes a stabilizer selected from the group consisting of alkaline earth carbonates, and other alkali metal carbonates and alkaline earth carbonates, and other alkali metal bicarbonates.

9. The composition of claim 8 wherein the composition includes a stabilizer of alkaline earth carbonates in the form of limestone.

10. The composition of claim 9 wherein the stabilizer is selected from the group consisting of calcium carbonate, magnesium carbonate, sodium carbonate, potassium carbonate, sodium bicarbonate and potassium bicarbonate.

11. A method of making a rubber composition comprising: adding to a rubberized compound in its liquid state, a zeolite dried at between 50° C. and 150° C. for between about one hour and twenty four hours; molding the liquid material; and shaping the solidified material.

12. The method of making a rubber composition of claim 11 wherein the rubberized carrier material is selected from the group of latexes consisting of natural latex, isoprenes, polyisoprenes, styrene butadienes, nitrile rubbers, butyl rubbers, ethylene propylenes terpolymers, silicone rubbers, neoprenes, polysulfides, poly acetyls, eperchlorides, fluoroelastomers, hypalon, halogenated butyls, polyurethanes, and thermoplastic rubbers.

13. The method of making a rubber composition of claim 12 wherein the zeolite is selected from the group consisting of chabzite, eroionite, mordenite, chinoptilolite, faujasite, philipsite, zeolite A, zeolite L, Zeolite Y, zeolite X and ZSM-5.

14. The method of making rubber composition of claim 13 wherein the zeolite is chinoptilotlite.

15. The method of making a rubber composition of claim 11 wherein the formulation includes at least one stabilizer selected from the group consisting of alkaline earth carbonates, and other alkali metal carbonates and alkaline earth carbonates, and other alkali metal bicarbonates.

16. The method of making a rubber composition of claim 15 wherein the stabilizer is selected from the group consisting of calcium carbonate, magnesium carbonate, sodium carbonate, potassium carbonate, sodium bicarbonate and potassium bicarbonate.

17. The method of making a rubber composition of claim 11 wherein the shaping step further comprises molding the insert from a liquid rubber zeolite composition.

18. The method of making rubber composition of claim 11 wherein the shaping step further comprises forming a sheet of a rubber zeolite composition, and cutting inserts of the appropriate size and shape.

19. A method of freshening an article comprising: placing a zeolite rubber insert in said article; wherein said insert is manufactured by drying said zeolite at between about one and twenty four hours and at a temperature of between about 100° C. and 150° C. before adding said zeolite to said rubber.

20. The method of claim 19 wherein said article is clothing, footwear or industrial materials.

21. The method of claim 19 wherein said article is footwear.

22. The method of claim 19 wherein said rubber comprises natural latex, isoprenes, polyisoprenes, styrene butadienes, nitrile rubbers, butyl rubbers, ethylene propylene terpolymers, silicone rubbers, neoprenes, polysulfides, poly acetyls, eperchloride, fluporelastomers, hypalon, halogenated butyl, polyurethanes, or thermoplastic rubbers.

23. The method of claim 19 wherein said zeolite is chabzite, eroionite, mordenite, chinoptilolite, faujasite, philipsite, zeolite A, zeolite L, Zeolite Y, zeolite X or ZSM-5.

24. The method claim 19 or 21 wherein said zeolite is chinoptilolite.

25. The method of claim 19 wherein said insert comprises a stabilizer.

26. The method of claim 25 wherein said stabilizer is an alkaline earth carbonate, alkali metal carbonate, alkaline earth bicarbonate, alkali metal bicarbonates, or a combination thereof.

27. The method claim 25 wherein said stabilizer is calcium carbonate, magnesium carbonate, sodium carbonate, potassium carbonate, sodium bicarbonate, potassium bicarbonate or a combination thereof.

28. The method of claim 19 further comprising removing said insert from said footwear to allow regeneration of said insert.

29. The method of claim 28 wherein said regeneration comprises heating from between about 50° and 150° C.

30. The method claim 28 wherein said regeneration comprises exposing said insert to sunlight.

* * * * *